Dec. 25, 1956 A. H. LUCAS, JR 2,775,394
COMPOSITE CAN WITH QUICK-OPENING SIDE WALL
Filed Feb. 1, 1954 2 Sheets-Sheet 1

INVENTOR
ALEXANDER H. LUCAS, Jr.
BY Mason, Porter, Miller & Stewart
ATTORNEYS

Dec. 25, 1956 A. H. LUCAS, JR 2,775,394
COMPOSITE CAN WITH QUICK-OPENING SIDE WALL
Filed Feb. 1, 1954 2 Sheets-Sheet 2

*INVENTOR*
ALEXANDER H. LUCAS, Jr.

BY *Mason, Porter, Diller & Stewart*

*ATTORNEYS*

United States Patent Office 2,775,394
Patented Dec. 25, 1956

2,775,394

COMPOSITE CAN WITH QUICK-OPENING SIDE WALL

Alexander H. Lucas, Jr., Van Wert, Ohio, assignor to Continental Can Company, Inc., New York, N. Y., a corporation of New York Application February 1, 1954, Serial No. 407,374

8 Claims. (Cl. 229—51)

The specification which follows relates to a composite can having single-ply, quick opening side wall. Composite cans are those which are made with a side wall of pulp or paper board, while the top and bottom are of metal. Such cans are admirably adapted for the merchandising of foods and other materials.

Among such products are foodstuffs, particularly bakery goods. The invention in particular has been developed for the packaging of oven ready biscuits.

Raised biscuits are placed on the market after the dough has risen partially, the biscuits cut to the desired form, and the further development of the raised dough carried out. Such biscuits can be sealed in a hermetic package, where the rise of the dough is completed with the development of some degree of pressure not exceeding the strength of the container wall.

After the biscuits have risen within the container (termed "proofing"), they are then stored and handled under refrigerated conditions to preserve the contents and to prevent development of excessive pressures that would otherwise burst the container or render it unsafe to handle.

The purchaser of such a product needs only to release the biscuits from the container and give them a quick baking to render them edible and appetizing.

In the course of the rise of the dough in the container enough pressure is developed so that if in opening it, a small opening is first made in the container, enough of the dough would immediately extrude through the opening and distort the biscuits before the opening is enlarged enough to release the internal pressure.

It is an object of my invention to provide a composite can of a single ply of paper board such that it may be opened simultaneously over the entire length of the side wall. In this way the release of pressure is equalized throughout the entire number of biscuits. This prevents any biscuit from being forced out of shape by the latent pressure from those biscuits which are still confined within the can.

A further object of the invention is to provide a can of this nature which may be opened without implements, but merely by the fingers.

It is a further object of the invention to provide a can which has full strength to withstand the pressure of the contents during storage, even though modifications have been made which will facilitate the opening of the can when desired.

It is incidental to the objects of this invention that the curvature of the side wall of the can is utilized to facilitate the opening movement and release of the contents.

Among the objects of my invention is to provide an opening in the can which is independent of the sealed area of the overlap or seam of the side wall.

In addition, the fiber structure of the paper board is utilized to guide the cleavage or splitting of the side wall during the opening movement.

Other objects of the invention will be readily understood from the following description of the preferred form as illustrated in the accompanying drawings in which.

Figure 1:
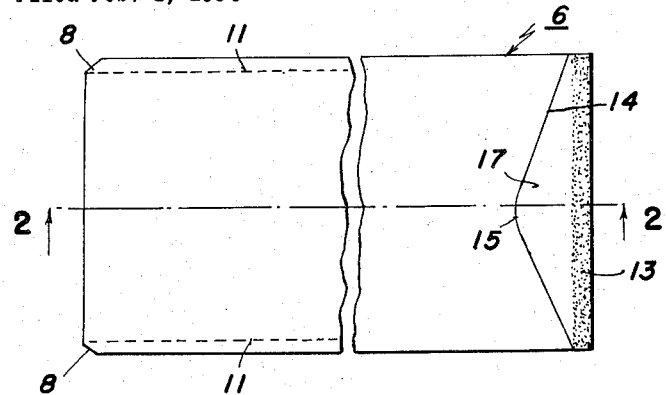
Fig. 1 is a plan view of the fiber board blank for the cylindrical side wall of the improved composite can.

Essentially the invention consists in so modifying the paper board side wall of the cylindrical container that it may be readily opened from end to end simultaneously without the use of implements. In accomplishing this result the cemented side seam is bypassed and the package opened by tearing the single ply of material between its outer and inner surfaces.

As illustrating the above, the invention is shown in the accompanying drawings in which the blank 6 is provided of fiber or paper board. This blank consists of a single ply of material which may consist of a heavy board, preferably made on a cylinder machine, or it may be made up by laminating two or more sheets together. The outer surface may be finished in any convenient way by a coating or a glaze. This may carry a printed design or the like.

In particular this outer surface coating should be moisture resistant. When the package is removed from refrigeration into a warm and humid atmosphere, the condensed water vapor tends to soften or weaken the container unless the outer surface is thus protected by an aluminum foil, lacquer or other coating.

It is apparent that if either score lines 11, 11 or 14, 14 or both are cut into the paper-board blank before the aluminum foil or coating is applied to the inner and outer surfaces, no additional coating or protection is needed at these points. When aluminum foil or coating is applied over the outer surface, the contour of the tab score lines 14, 14 is visible and the foil or tissue backed foil is weak enough so that the tab 17 will function as intended.

The inner surface is preferably provided with a lining 7 which is suitably resistant to the material contained in the package. Thus the lining may consist of aluminum foil, plastic film, a lacquer finish or the equivalent.

This utility is particularly desirable in packaging a number of small articles such as raised biscuits which during storage will swell and exert a definite degree of pressure uniformly over the inner surface of the package or container. As an example of this, reference is made to the common use of these containers for packaging raised, uncooked biscuits or muffins.

At one end of the blank the corners are cut away as shown at 8, 8. This is customary practice in the formation of metallic food containers where the ends are rolled down or seamed over the edges of the side wall and it is desirable that the latter therefore be of a single thickness at the points where the top 9 and bottom 10 are attached to the overlapped edge.

The longitudinal edges of the blank beginning near the corners 8, 8 are scored on the inner or lined side for a considerable distance parallel to the side edges. These scorings 11, 11 penetrate outwardly from the lining 7 for approximately one fourth the thickness of the material of the blank. The sidewall is thus weakened along the scorings.

These scorings 11, 11 are placed as close to the side edges as possible so that they will be immediately adjacent but not covered by the rolled edges of the top 9 and the bottom 10. They serve as guides for the rupture of the side wall in the opening movement and also reduce the effort required to open the package.

When the scoring is carried out after the lining 7 has been applied to the blank stock, thin coatings 12 are applied over the scored portions to restore the impermeability of the inner surface. In this way there will be no leakage to impair the sealed character of the side wall at this point.

The opposite end of the blank becomes the inner portion of the overlapping seam. For this purpose a coating 13 of adhesive is placed across the end on the outer surface.

Figure 3:
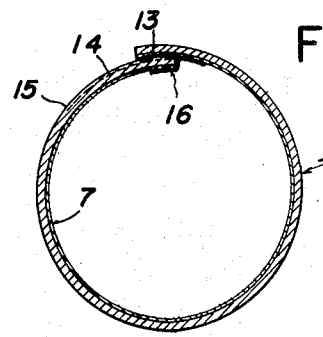
Fig. 3 is a similar transverse section of the side wall in final form.

A like coating can be applied to the opposite or inner surface of the end edge containing the clipped corners 8, 8. The side wall is formed from the blank by bending it so that the ends overlap as shown in Fig. 3 with the adhesive between. The adhesive is preferably thermoplastic and the seam completed by the application of heat and pressure.

Figure 2:
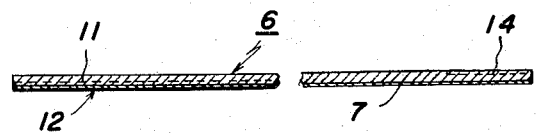
Fig. 2 is a longitudinal section of the blank on the line 2—2 of Fig. 1.

Ready opening of the side wall is accomplished by providing two scored lines 14 inclined inwardly from near the adjacent corners of the blank and meeting at the center to form the tab apex 15. This scoring extends for about one fourth of the thickness of the stock and is indicated in dotted lines on Figs. 2 and 3. This scoring at the outer ends practically leads into the tear back scores 11 so that when the tab score is pulled back and the side seam opened, the natural tear opening will progress along lines 11.

Figure 4:
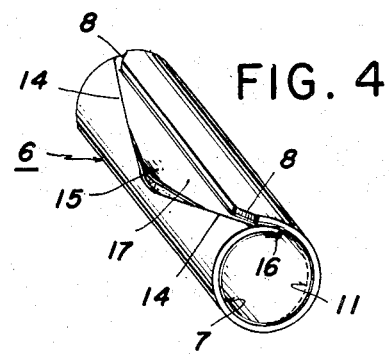
Fig. 4 is a perspective view of the same with the separation of the tab indicated.
Figure 5:
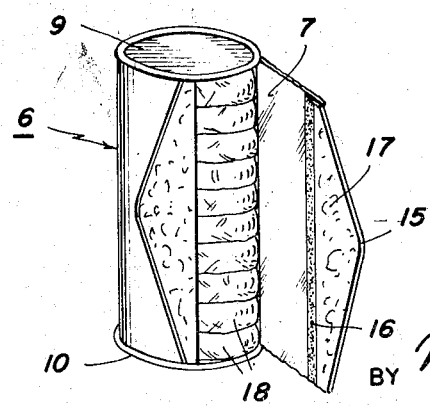
Fig. 5 is a perspective view of the sealed can following its opening to release the contents.

In order to adequately protect the inner exposed edge of the overlapping seam, a thin layer or coating 16 is applied as shown in Figs. 3 and 4. This coating must be impermeable to the contents of the package but at the same time frangible to facilitate the opening of the package.

When, however, it is desired to open the package, the apex 15 of tab 17 may be separated by pressing down on the side wall beyond the tab. This will cause the tab apex 15 to rise slightly from the side wall to the extent that it may be grasped and used for rapidly tearing the triangular tab 17 formed by the scoring 14.

The stock of the paper board or other material of which the blank 6 is made, is weakest in its interior, that is, between the inner and outer surfaces. As a consequence pulling the tab apex 15 shears or tears apart the fibers of the interior of the side wall and forms a tab 17. As the tearing progresses to the inner end, it continues beneath the seam and leads into the tear back scores 11. The seam is therefore bypassed completely and not affected by the opening movement.

When the tearing has progressed to the edge of the inner end, the outer end is readily bent away and the seal 16 over the seam is broken.

This separation of the side wall occurs simultaneously through the entire length of the side wall from the top 9 to the bottom 10. Thus any accumulated pressure on the interior is immediately relieved and distributed uniformly throughout the length of the container. In this way there is a minimum tendency for localized distortion of the individual articles, such as raised biscuits, that may be in the package.

If the triangular tab 17 is pulled farther around the package, this end of the blank is readily separated from the top and bottom along the lines of weakness created by the scorings 11, 11. The opening movement may continue until the package is opened sufficiently to lift or shake the contents out of the package.

Advantages of such a construction are evident. The package or carton is securely seamed along the side with the usual reinforcing strength. The ends 9 and 10 are applied as usually and form customary strengthening areas. The contents of the package may develop considerable internal pressure and swell without any tendency toward rupture of the side wall.

Advantage is taken of the fact that a single ply of paper board has an area of weakness intermediate the inner and outer surfaces. The scoring 14 at the tab apex 15 thus produces an initial separation when pressure is applied to the side wall beyond this point or the tab apex 15 is picked away.

The tab 17 is easily peeled back along this area of weakness. This carries the opening beyond the side seam and its cement 13. Ready fracture of the sealing coating 16 releases internal pressure simultaneously over the entire length of the package. This effectively prevents localized release of pressure with its attendant distortion of the contained articles.

Establishing a weakness along the scorings 11, 11 permits further opening of the side wall while the top 9 and bottom 10 maintain normal cylindrical position of the package and provide edges from which the side wall is readily torn along the lines established by the scorings 11, 11.

The specific material and form of the ends 9 and 10 are immaterial. Thus the invention is equally applicable to those forms of containers in which the ends have flanges overlapping the side wall edges.

By turning the opened package with the opening down, the biscuits 18, or other articles, fall out readily.

Figure 6:
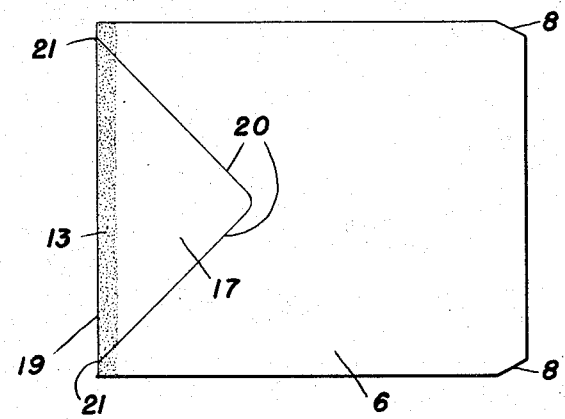
Fig. 6 is a side view of the outer side of a blank of modified form.
Figure 7:
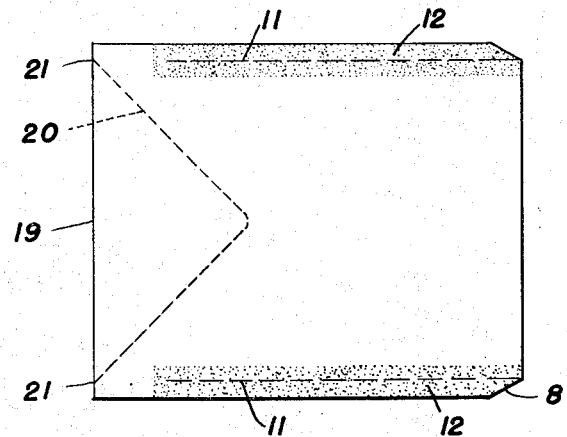
Fig. 7 is a side view of the inner side thereof.
Figure 8:
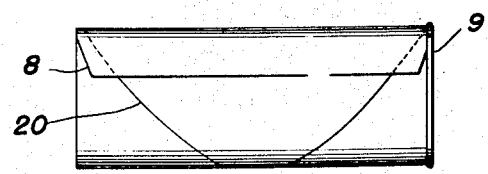
Fig. 8 is a side view of the resulting can with one end only assembled.

In Figs. 6, 7 and 8 a slightly modified form of container is shown.

The blank 6 is the same shape as already described. The outside face shown in Fig. 6 has a thin coating of adhesive 13 across the end 19 opposite that having the cut corners 8, 8.

In the form of the invention the scored lines 20, 20 diverge from their juncture on the longitudinal axis to points 21, 21 on the end 19. Preferably the points 21, 21 are spaced from the side edges in line with the scorings 11, 11 on the inner face of the blank (Fig. 7). The scorings 11, 11 are sealed with thin coatings 12 as in the first form.

Fig. 8 shows the side of the can formed by overlapping the end edges with the cut out corners outside. Here the scored lines 20, 20 extend under the overlapping end to an intersection with the scored lines 11.

When the tab 17 is pulled out from the side wall, it binds the overlapping end out and breaks it at the edge near the cover 9. This brings the tab with the overlapping end to the scored lines 11, 11. A slight pull out on the tab 17 breaks the side wall at the scored lines 11, 11, and the wall may then be bent out and back as far as desired or to the ends of the lines 11, 11.

The invention has been described above in its essential features. Extensive variation may be observed in material, proportions and minor details without, however, departing from the invention as defined in the following claims.

What I claim is:

1. A composite can with a top and a bottom and having a single ply of paper board or like material having the ends overlapped and sealed together at their edges with an intermediate adhesive coating to form a continuous side seam, the outer surface of the underlying end of the ply being scored inwardly along inclined lines spaced from said seam to form a tab which may be torn away from the ply intermediate the inner and outer surfaces thereof to the edge of the ply under the side seam.

2. A composite can with a top and a bottom and having a single ply of paper board or like material having the ends overlapped and sealed together at their edges with an intermediate adhesive coating to form a continuous side seam, the outer surface of the underlying end of the ply being scored from near the corners inwardly along inclined lines spaced from said seam to a median point of intersection to form a tab which may be torn away from the ply intermediate the inner and outer surfaces thereof to the edge of the ply under the side seam.

3. A composite can with a top and a bottom and having a single ply of paper board or like material having the ends overlapped and sealed together at their edges with an intermediate adhesive coating to form a continuous side seam, the outer surface of the underlying end of the ply being scored from near the corners inwardly along inclined lines spaced from said seam to a median point of intersection to form a tab, said ply beyond the point of intersection being sufficiently flexible to yield under digital pressure and separate the tab and free it to be grasped and torn away from the ply intermediate the inner and outer surfaces thereof to the edge of the ply under the side seam.

4. A composite can with circular top and bottom members and having a single ply of paper board or like material having its ends overlapped and sealed together at their edges with an intermediate adhesive coating to form a cylindrical sidewall with a continuous side seam, the outer surface of the underlying end of the ply being scored from near the corners inwardly along inclined lines spaced from said seam to a median point of intersection to form a tab, said ply beyond the point of intersection being sufficiently flexible to be flattened out of cylindrical form under digital pressure and cause the tab to be separated from the ply and free to be grasped and torn away from the ply intermediate the inner and outer surfaces thereof to the edge of the ply under the side seam.

5. A composite can with a top and a bottom and having a single ply of paper board or like material, said ply having coated inner and outer surfaces and having the ply ends overlapped and sealed together at their edges with an intermediate adhesive coating to form a continuous side seam, the outer surface of the underlying end of the ply being scored inwardly along inclined lines spaced from said seam to form a tab which may be torn away from the ply through the fibrous area between the coated surfaces thereof to the edge of the ply under the side seam.

6. A composite can with a top and a bottom and having a single ply of paper board or like material having the ends overlapped and sealed together at their edges with an intermediate adhesive coating to form a continuous side seam, the outer surface of the underlying end of the ply being scored inwardly along inclined lines spaced from said seam to form a tab which may be torn away from the ply intermediate the inner and outer surfaces thereof to the edge of the ply under the side seam.

7. A composite can having a side wall composed of a single ply of paper board or like material, and a top and a bottom each formed with a bead over the adjacent edges of the side wall, said ply having the ends overlapped and sealed together at their edges with an intermediate coating to form a continuous side seam, the outer surface of the underlying end of the ply being scored inwardly along inclined lines spaced from said seam to form a tab which may be torn away from the ply intermediate the inner and outer surfaces thereof to the edge of the ply under the side seam, the inner surface of the outer ply being scored lightly for a distance from the overlying end in lines opposite the beads of the top and bottom.

8. A composite can having a single ply of paper board or like material having the corners at one end cut away and said end lapped over the opposite end and sealed thereto at their edges with an intermediate adhesive coating to form a side wall with a continuous side seam of single thickness, a top and a bottom formed with a bead over the adjacent edges of the side wall, the outer surface of the underlying end of the ply being scored inwardly along inclined lines spaced from said seam to form a tab which may be torn away from the ply intermediate the inner and outer surfaces thereof to the edge of the ply under the side seam and cut-away corners of the overlying end, the inner surface of the ply being scored lightly for a distance from the overlying end in lines parallel and adjacent each side edge.

References Cited in the file of this patent

UNITED STATES PATENTS

| | | |
|---|---|---|
| 1,779,350 | Wright | Oct. 21, 1930 |
| 2,186,973 | Hothersall | Jan. 16, 1940 |
| 2,215,348 | Cowan | Sept. 17, 1940 |
| 2,608,341 | Eckman | Aug. 26, 1952 |

FOREIGN PATENTS

| | | |
|---|---|---|
| 515,282 | Great Britain | Nov. 30, 1939 |